Figure 1A:
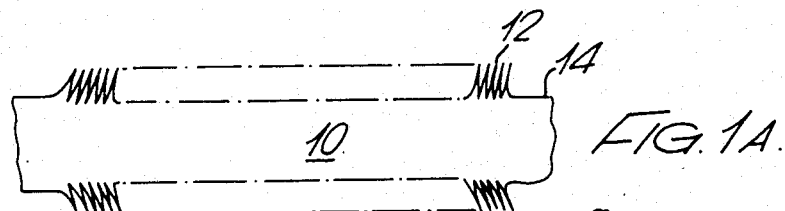

United States Patent [19]

Wood et al.

[11] Patent Number: 4,792,047
[45] Date of Patent: Dec. 20, 1988

[54] PROCESS OF FORMING AN END CLOSURE

[75] Inventors: John D. Wood; Jason R. Ware; Alan N. Syrop, all of Cambridge, England

[73] Assignee: Devro, Inc., Somerville, N.J.

[21] Appl. No.: 659,059

[22] Filed: Oct. 9, 1984

[30] Foreign Application Priority Data

May 10, 1984 [EP] European Pat. Off. ........ 84303163.4

[51] Int. Cl.⁴ ...................... A22C 13/00; B65D 85/08
[52] U.S. Cl. ...................................... 264/138; 17/49; 138/118.1; 156/69; 156/165; 206/525; 264/157; 264/163; 264/295; 264/296; 264/339; 426/140
[58] Field of Search .............. 17/42, 49, 1 R; 55/502; 138/109, 118, 118.1, 121; 206/525, 802; 426/105, 106, 135, 138, 140; 264/138, 157, 163, 295, 296, 339; 156/69, 165

[56] References Cited

U.S. PATENT DOCUMENTS

| 2,186,435 | 1/1940 | Serr | 426/105 |
| 3,061,165 | 10/1962 | Rench et al. | 206/525 |
| 3,274,005 | 9/1966 | Alsys | 17/49 |
| 3,882,252 | 5/1975 | Winkler | 426/138 |
| 3,942,568 | 3/1976 | Stemmler | 426/138 |
| 4,183,964 | 1/1980 | Vinokur | 426/135 |
| 4,364,511 | 12/1982 | Wittern et al. | 426/105 |
| 4,411,048 | 10/1983 | Green | 426/140 |
| 4,450,964 | 5/1984 | Wood | 55/502 |
| 4,479,283 | 10/1984 | Hollingsworth | 17/49 |
| 4,500,574 | 2/1985 | Hanlon | 17/49 |

Primary Examiner—Jimmy G. Foster

[57] ABSTRACT

A process of forming an end closure of one end of a stick of shirred sausage casing. The casing 10 is twisted and then the twisted neck (16) is compressed and heated to seal it. The twisted portion is severed so as to form an end seal with about four to eight twists in it. This end seal resists rupture during stuffing.

7 Claims, 1 Drawing Sheet

PROCESS OF FORMING AN END CLOSURE

The present invention relates to closure of one end of a stick of shirred tubular food casing, such as sausage casing, prior to stuffing.

In sausage product manufacture, a shirred sausage casing, which is a tubular casing of sausage skin in the form of a stick with a large internal hole, folded circumferentially and highly compressed in length, is closed at one end with an end link and pulled over a sausage stuffing horn. Sausage meat is extruded from the horn and the stuffed tube is then linked or twisted to form a string of sausages.

For mechanised stuffing it is preferable for the shirred casing to be supplied to the stuffing head with the end link formed. Threading, stuffing and linking can then proceed one string after another continuously. If a shirred casing stick without closure is used, the process of forming the end link introduces a manual stage, or a further mechanised closing action is needed prior to stuffing. On economic grounds, it is preferable to carry out the closure as part of the shirred stick manufacture process, and to supply shirred casing sticks with an integral closure formed at one end. It is obviously desirable for the closure to be formed reliably, so that stuffing is performed on one stick after another without casing rupture, which may occur as a result of the end link becoming untwisted.

Hitherto twisting and pressing of the casing has been performed to make the end link in imitation of manual closure on the stuffing machine. Glue can also be used to set the end link at the point where the skin is twisted.

A process has now been found by which an end link having substantial physical integrity can be formed. This enables a stick with an end closure which substantially resists untwisting to be produced.

The present invention in one aspect comprises a process for forming an end closure on one end of a shirred stick of tubular food casing such as sausage casing, said process including twisting or otherwise gathering the free end of the casing to form a neck, heating and pressing the neck to form a seal and then preferably cutting or trimming the neck.

In a further aspect of the invention the process for forming an end closure includes gathering the material of the casing into a neck and heating the neck under pressure. Preferably the neck is heated to a temperature in the case of collagen in the range 40° C. to 200° C. A narrower preferred range is 100° C. to 150° C.

The invention in a further aspect comprises the processes (regardless of sequence of execution) of:
 (a) twisting or otherwise gathering the free end of the casing to form a neck
 (b) heating the casing or the neck;
 (c) cutting the casing or the neck;
 (d) pressing the neck.

The invention in a further aspect comprises a stick of shirred sausage casing having a closure formed in one end of the casing by said process including twisting or otherwise gathering the end to form a neck, heating and pressing the neck. The resulting neck is preferably cut or trimmed. In a preferred form the resulting end closure has a set which resists untwisting and has typically a length of 2-20 mm.

Figure 1B:
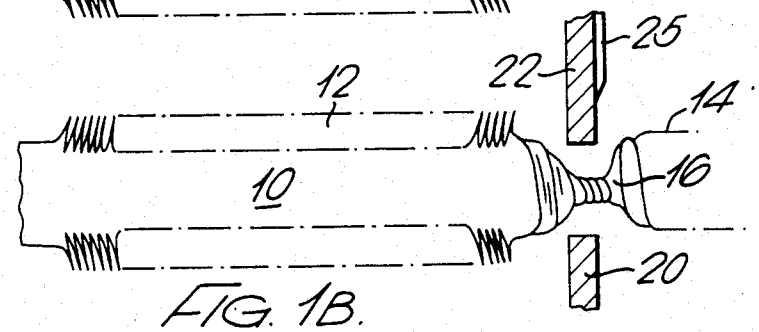
Figure 1C:
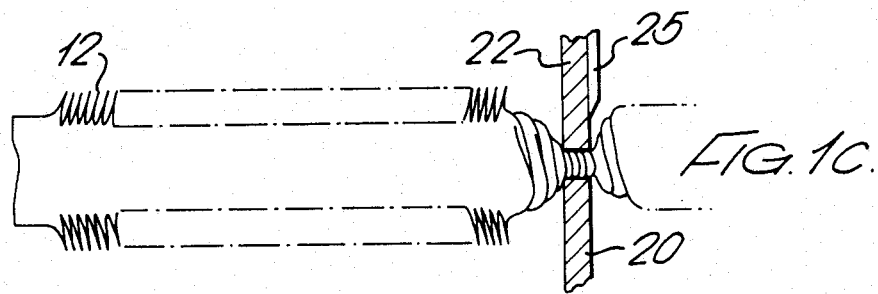
Figure 1D:
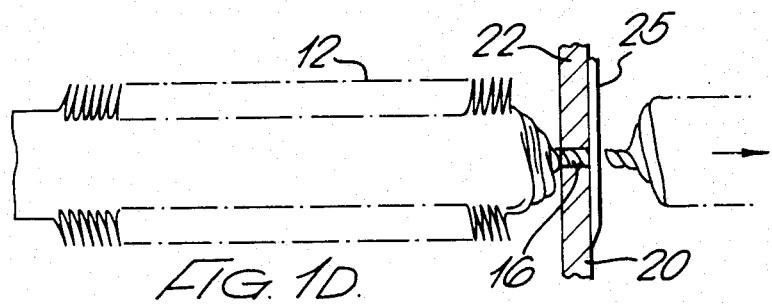
Figure 2:
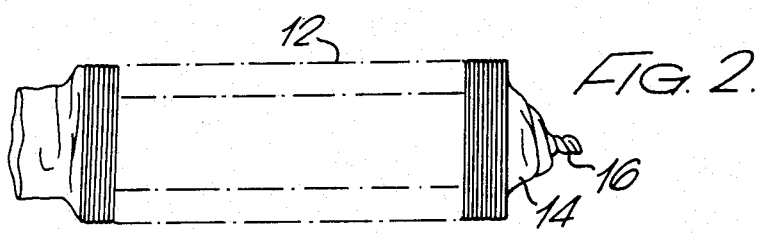

The invention will now be described by way of example by reference to the following illustrations in which:

FIG. 1A shows in section a stick of shirred sausage skin;
FIG. 1B shows a stick with one end linked adjacent devices for completing the end closure process;
FIG. 1C shows the linked end heated and pressed;
FIG. 1D shows the linked end cut after sealing; and
FIG. 2 shows the stick of shirred sausage skin with a linked end.

FIG. 1 shows a sequence of steps for forming the end link or closure on a stick of shirred sausage casing. In FIG. 1A a stick 10 of shirred sausage casing 12 is shown in section. One end 14 of the stick is drawn free and forms a short tube of casing material.

Only the essential steps of the process for forming an end link or closure at one end of the stick are shown in the FIGS. 1B-D. In FIG. 1B the free end 14 of the casing stick is shown having been twisted. This normally requires about 8 to 16 twists. Adjacent the twisted neck 16 are shown devices for heating the twisted portion, for pressing it and for severing or cutting the residual free end from the end link.

After twisting the free end, the twisted portion is heated by any suitable means. Such means are by a jet of heated air played over the neck 16, by infra red radiation or by applying a heated surface to the neck. In FIGS. 1B and 1C jaws 20 and 22 for pressing the neck are shown. The jaws are heated to a selected temperature and after twisting the neck, are applied to it as shown in FIG. 1C. This heats and presses the neck. The free end of the casing is then severed or cut as shown in FIG. 1D, using the knife 25.

The left hand and right hand portions of the stick then have from 4 to 8 twists each. As shown there are four twists two of which are in the constructed heat sealed portion of the neck and two in the conical end portion (see FIG. 2).

After releasing the press jaws, an end link or closure is formed which ostensibly resists untwisting and has substantial physical integrity. The shirred stick of casing with an end link or closure neatly trimmed is shown at FIG. 2.

With heated press jaws 20 and 22 as illustrated in FIG. 1C, it will be realised that heating and pressing occur at substantially the same time. Air or radiant heating of the twisted neck 16 have also been used effectively. Using these heating methods, heating or preheating is performed prior to pressing. The casing could also be heated or pre-heated prior to twisting.

The process of twisting, heating and pressing set the casing material in the neck. This may be the result of a re-orientation or a contraction of the polymer chains of the casing material in the neck, which are previously stretched and aligned during casing manufacture.

An end link so formed is found reliably to restrict rupture during stuffing in automatic stuffing.

The temperature to which the neck 16 is heated, and therefore the temperature of the jaws 20 and 22, or the airjet etc., depends on the material of the casing. For example, in the case of a natural skin material such as collagen a temperature in the range 120° C. to 150° C. is found effective. Different temperatures are appropriate for regenerated cellulose casing materials.

The essential steps for forming an end link or closure of the shirred casing stick as described above are twisting or otherwise gathering the free end of the casing tube to form a neck, heating and pressing the neck, and cutting or severing the free end.

These steps may be performed by equipment integral with a shirring machine as a further stage in the shirred stick production operation, or as a subsequent and separate end closure process. In each case the same essential steps described are performed.

Also equipment for automatically forming an end link or closure may include many components not shown in FIG. 1, such as conveyors, handling means for donning and doffing the casing stick, air supply for inflating and drawing out the free end of the casing etc., but subject to including also the processes of twisting or otherwise gathering a free end to form a neck, heating and pressing the twisted neck, and then trimming the free end, are claimed to fall within the scope of this invention. A closure so formed is readily recognised by a skilled man.

An unexpected advantage which arises from use of the process according to this invention is that the twisted neck of the collagen or other casing, when sealed by using the present invention, is able to withstand surges of pressure such as occur when the casing is filled with sausage meat extruded under high pressure. The heat sealed twisted end withstands this pressure better than known sealing arrangements because the twist provides a certain amount of "give" in that a degree of untwisting occurs which accommodates and acts as a buffer to the surge of pressure arising when the sausage meat is injected or extruded into the casing.

We claim:
1. A process of forming an end closure for a stick (10) of shirred tubular collagen food casing, the process comprising twisting the free end (14) of the casing to form a neck (16) and heating the neck (16) of twisted casing to a temperature in the range of 40° C. to 200° C. and pressing the neck (16) to form a seal.
2. A process according to claim 1 in which the neck is cut after heat sealing.
3. A process according to claim 2 in which between 8 and 16 twists are applied to the neck before it is cut so that after it is cut there are between 4 and 8 twists in the end seal.
4. A process according to claim 1 and in which the heating and pressure are applied simultaneously.
5. A process according to claim 4 in which the neck (16) is heated to a temperature in the range 120° C. to 150° C.
6. A process according to claim 5 in which the heating is effected by applying a heated surface to the neck.
7. A process according to claim 6 and in which jaws are employed for pressing the neck, the jaws being heated to a selected temperature and after twisting the neck being applied so as to heat and press the neck simultaneously.

* * * * *